US007665675B2

(12) United States Patent
Montague

(10) Patent No.: US 7,665,675 B2
(45) Date of Patent: Feb. 23, 2010

(54) ROLLING WATERING SYSTEM

(76) Inventor: Joshua M. Montague, 9 Lookout Pl., Ardsley, NY (US) 10502

( * ) Notice: Subject to any disclaimer, the term of this patent is extended or adjusted under 35 U.S.C. 154(b) by 562 days.

(21) Appl. No.: 11/620,122

(22) Filed: Jan. 5, 2007

(65) Prior Publication Data

US 2009/0120971 A1 May 14, 2009

(51) Int. Cl.
*A01G 25/14* (2006.01)
*A01G 25/09* (2006.01)
*B05B 9/03* (2006.01)
*B05B 9/00* (2006.01)

(52) U.S. Cl. .................. 239/377; 239/146; 239/147; 239/149; 239/154; 239/722; 239/289

(58) Field of Classification Search .................. 239/377, 239/722, 146, 147, 149, 155, 154, 172, 176
See application file for complete search history.

(56) References Cited

U.S. PATENT DOCUMENTS 2,554,875 A * 5/1951 Okunami .................. 248/141
2,937,836 A * 5/1960 Fleischman ................. 248/141
4,057,277 A * 11/1977 Burkholder ................ 294/50.8
5,316,248 A * 5/1994 Allen .......................... 248/129

* cited by examiner

*Primary Examiner*—Dinh Q Nguyen
*Assistant Examiner*—Justin Jonaitis
(74) *Attorney, Agent, or Firm*—Mark Montague; Cowan, Liebowitz & Latman, P.C.

(57) ABSTRACT

A watering system includes a watering can and a dispensing system. The dispensing system includes a cart for supporting the watering can, wheels coupled to a bottom of the cart and adapted to facilitate movement of the dispensing system on a surface, and a lever movably coupled to the cart and adapted to allow for manual movement of the watering can between a lowered position in which water held in the watering can's bucket is not dispensed and a raised position in which water held in the buck is dispensed through the watering can's spout. The lever has an exposed end adapted to be lowered by a user to move the watering can from the lowered position to the raised position.

4 Claims, 5 Drawing Sheets

ROLLING WATERING SYSTEM

BACKGROUND OF THE INVENTION

1. Field of the Invention

This invention relates to a rolling watering system and, more particularly, to a system for and method of moving a heavy watering can and using the watering can without the need to lift the watering can with one's arms.

2. Description of the Related Art

Watering cans are well known, and come in various shapes and sizes. Small watering cans are quite useful for watering small plants. Unfortunately, a small watering can must be re-filled with water multiple times if many plants or a few large plants need to be watered. Large watering cans, while useful for large watering jobs, such as watering large plants and shrubs, are very heavy when filled with water. Lifting and carrying heavy watering cans requires much exertion and may cause back problems. Thus, it would be desirable to provide a watering device/system that can be easily moved, has a large watering capacity, and is easy to use.

OBJECTS AND SUMMARY OF THE INVENTION

In view of the above-mentioned problems with existing watering cans, it is an object of this invention to provide a rolling watering system that overcomes the above-mentioned problems.

It is another object of the invention to provide a rolling watering system that minimizes the amount of physical effort needed to carry out large watering tasks.

It is a further object of the invention to provide a rolling watering system that allows for the use of larger watering cans for various types of watering needs, such as watering trees, shrubs, bushes, flower beds, etc.

It is an additional object of the invention to provide a rolling watering system that is utilized without requiring the user to pickup a watering can with his/her hands.

In accordance with the present invention, the rolling watering system includes a watering can and a dispensing system. The watering can has a bucket adapted to hold water and a spout coupled to the bucket and adapted to dispense the water held in the bucket. The dispensing system has a cart for supporting the watering can, wheels coupled to the bottom of the cart and adapted to facilitate movement of the dispensing system on a surface, and a lever movably coupled to the cart and adapted to allow for manual movement of the watering can between a lowered position in which water held in the bucket is not dispensed and a raised position in which water held in the buck is dispensed through the spout. The lever has an exposed end adapted to be lowered by a user to move the watering can from the lowered position to the raised position.

As an aspect of the invention, the lever includes a second end opposite the exposed end, the second end disposed beneath a rear position of a bottom of the watering can.

As another aspect of the invention, the cart includes a support floor adapted to support the watering can. The cart includes a bottom floor to which plural wheels are coupled. The support floor and the bottom floor are separated from one another.

As a feature of this aspect, the bottom floor is adapted to hold gardening tools.

As a further aspect of the invention, the cart includes a rear support, and the watering system includes an elastic cord coupled between the rear support and the watering can and adapted to stabilize the watering can during movement of the watering system on the surface and to stabilize the watering can during movement of the watering can between the lowered position and the raised position.

As a feature of this aspect, the cart includes left and right side supports. The watering can is disposed between the left and right side supports. The watering system further includes a second elastic cord coupled between the left and right side supports and disposed in front of the watering can at a position near the spout and adapted to stabilize the watering can during movement of the watering can between the lowered position and the raised position.

As an additional aspect of the invention, the cart includes a flat support floor adapted to support an entire bottom of the watering can.

As yet another aspect of the invention, the cart includes a support floor adapted to support left and right portions of a bottom of the watering can. The support floor does not support a center bottom of the watering can.

As a feature of this aspect, the lever is adapted to allow for a pivoting of the watering can along an axis disposed between a bottom front end of the watering can and a center-bottom point of the watering can during movement of the watering can between the lowered position and the raised position.

As another feature of this aspect, the support floor includes a left cylinder adapted to support the left portion of the bottom of the watering can, and a right cylinder adapted to support the right portion of the bottom of the watering can.

As yet a further aspect of the invention, the cart includes multiple hooks for supporting garden tools.

As yet an additional aspect of the invention, the watering system includes a rope that extends from the dispensing system. The rope allows a user to pull the watering system on a surface, generally while standing. The rope further is used to stabilize the watering system when the watering can is in the raised position and dispensing water.

In accordance with another embodiment of the present invention, a watering system comprises a dispensing system having a cart for supporting a watering can having a spout, wheels coupled to a bottom of the cart and adapted to facilitate movement of the dispensing system on a surface, and a lever movably coupled to the cart and adapted to allow for manual movement of the watering can between a lowered position in which water held in the watering can is not dispensed and a raised position in which water held in the watering can is dispensed through the spout, the lever having an exposed end adapted to be lowered by a user to move the watering can from the lowered position to the raised position.

Various aspects and features mentioned above also apply to this second embodiment (that does not explicitly include a watering can).

Various other objects, advantages and features of the present invention will become readily apparent to those of ordinary skill in the art, and the novel features will be particularly pointed out in the appended claims.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF PREFERRED EMBODIMENTS

Figure 1:
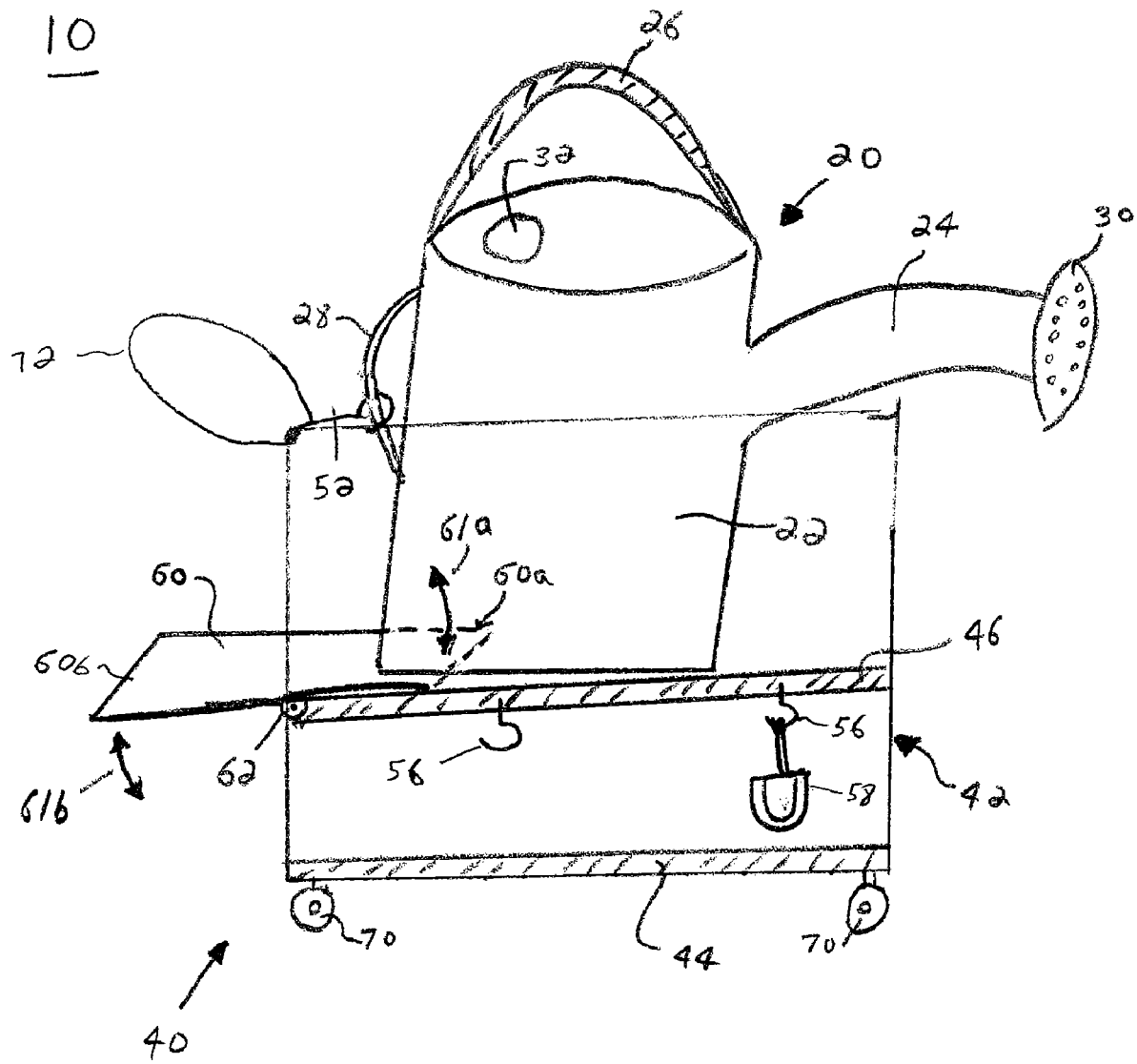
FIG. 1 is a schematic illustration of the rolling watering system of the present invention.

The rolling watering system of the present invention entails various features, as described herein, that allows gardeners and other individuals to easily water shrubs, bushes, trees, flower beds, vegetable gardens, etc., using relatively large watering cans without requiring users to pick up the watering cans in order to dispense water (or another fluid). In general, any existing, suitably sized watering can may be utilized with the rolling watering system of the present invention. Although one particular design of watering can is shown in the drawings, other designs, shapes and sizes may be utilized.

Referring now to the drawings, FIG. 1 thereof shows the rolling watering system 10 of the present invention. As shown, the rolling watering system includes a watering can 20 and a rolling/dispensing system 40. Watering can 20 may be, as mentioned above, any suitably sized watering can that can be purchased or otherwise obtained from various retail stores or other sources. Watering can 20 includes a bucket 22, a spout 24, a top handle 26 and, optionally, a side handle 28. Watering can 20 may include a snout 30 (also known as a rose or rosette) with multiple openings to provide a gentle stream to the plants during watering. Watering can 20 further includes a relatively large opening 32 in the top surface of bucket 22 to allow for the watering can to be filled with water using a standard garden hose connected to a water faucet.

Rolling/dispensing system 40 of the present invention (also called "dispensing system 40" herein) includes a cart 42 (also called "support system" herein), a lever 60, and a set of wheels 70. Wheels 70 may be wheels, castors or other suitable device that allow for the relatively easy movement of the rolling watering system 10 on various surfaces including grass, dirt, concrete, etc. Preferably, wheels 70 are sufficiently large to facilitate movement on relatively rough surfaces including gravel, bumpy lawns and gardens, and so on. Preferably, dispensing system 40 includes four wheels to prevent tipping over of the device while a relatively heavy watering can (e.g., completely filled with water) is disposed on dispensing system 40 as herein described. Dispensing system 40 may also include five or more wheels. Although generally not preferred, dispensing system 40 may include three wheels. In another variation, dispensing system includes one or two wheels and is moved via one or two lift-up handles (not shown in the drawings) in a manner similar to how a wheel barrow is utilized.

Figure 2:
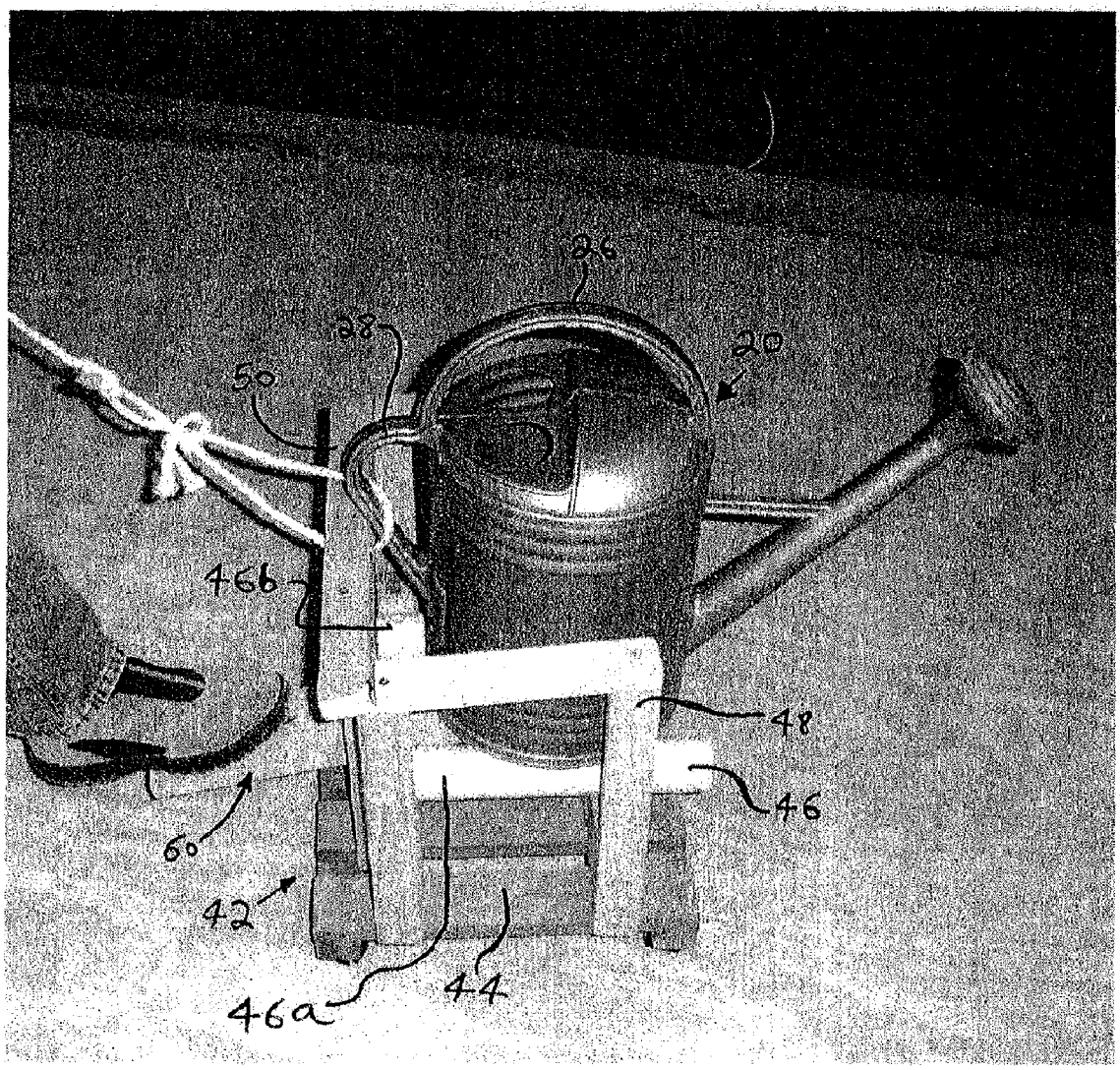
FIG. 2 is a photograph of an exemplary rolling watering system in accordance with the present invention.
Figure 3:
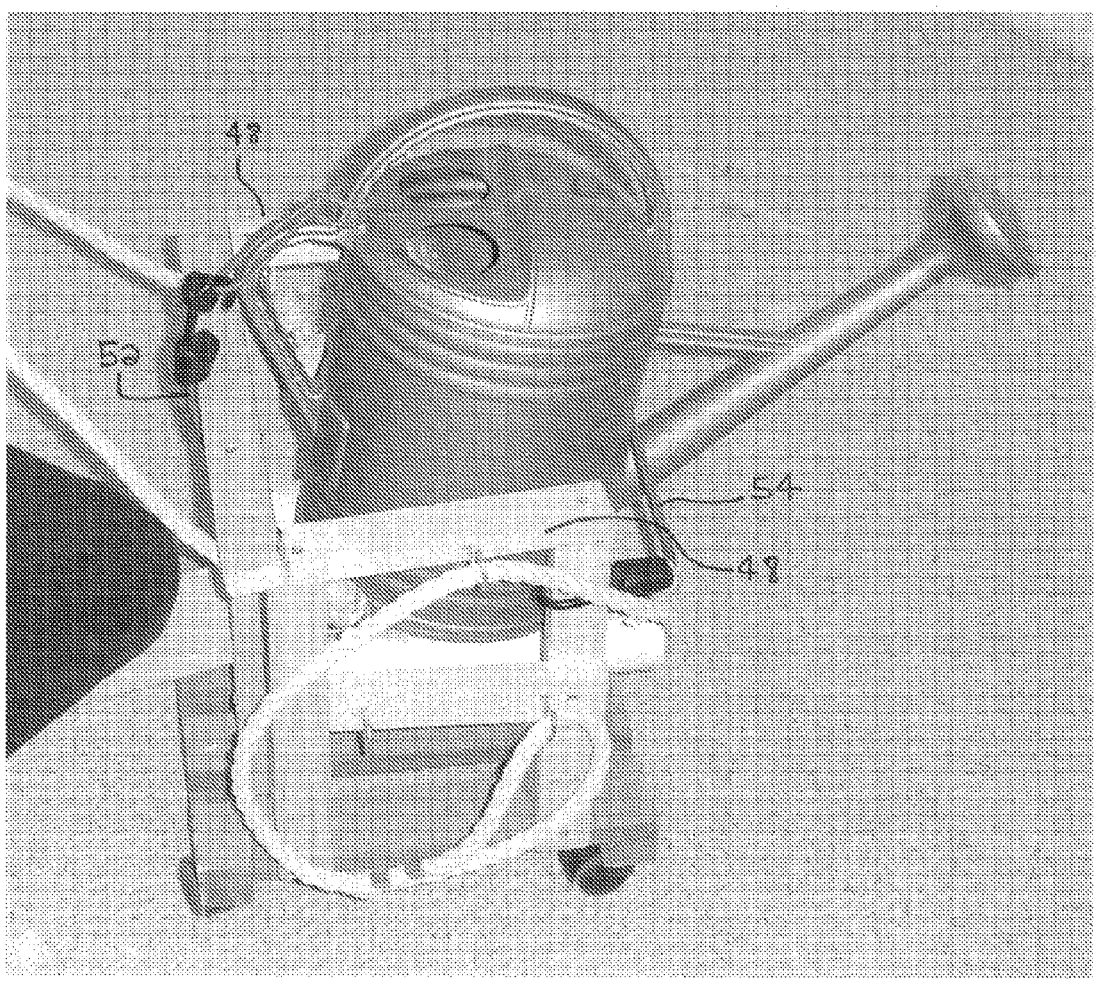
FIG. 3 is another photograph of the exemplary rolling watering system in accordance with the present invention.

As shown in FIGS. 2 and 3, cart 42 of dispensing system 40 includes a bottom 44 (also referred to herein as "bottom floor"), a watering can support floor 46 (also called "support floor"), left and right side supports 48, and a rear support 50. Preferably, cart 42 does not include any sort of front support structure to allow for the use of watering cans of different shapes and sizes, as well as spout configurations. Cart 42 may be a closed structure wherein left and right side supports 48 and rear support 50 are solid or semi-solid structures (e.g., panels). Cart 42 may be an open structure wherein left and right side supports 48 and rear support 50 are comprised of only support elements, such as shown in the figures.

During use of the present invention, watering can 20 is disposed on top of and supported by support floor 46 of cart 42, and disposed between left and right side supports 48. An elastic cord 52 or other appropriate connector is coupled between handle 28 of watering can 20 and rear support 50 of cart 42, and is designed to prevent watering can 20 from falling off support floor 46 and/or falling off lever 60 (further discussed below) during use of the rolling watering system of the present invention. Optionally, an additional elastic cord 54 may be utilized, as shown in FIG. 3, to further prevent watering can 20 from falling off support floor 46 and/or lever 60 during use. If the additional elastic cord 54 is utilized, elastic cord 54 preferably is coupled between the front ends of left and right side supports 48 and disposed in front of watering can 20 (i.e., at the spout side), as shown in FIG. 3.

Lever 60 of dispensing system 40 is pivotably attached to rear support 50 of cart 42 using any appropriate, known pivotal connection technique. Lever 60 is sufficiently long so that the lever's front end 60a is disposed beneath the rear bottom surface of watering can 20. Lever 60 is coupled to cart 42 so that it pivots about a pivot axis 62.

Figure 4:
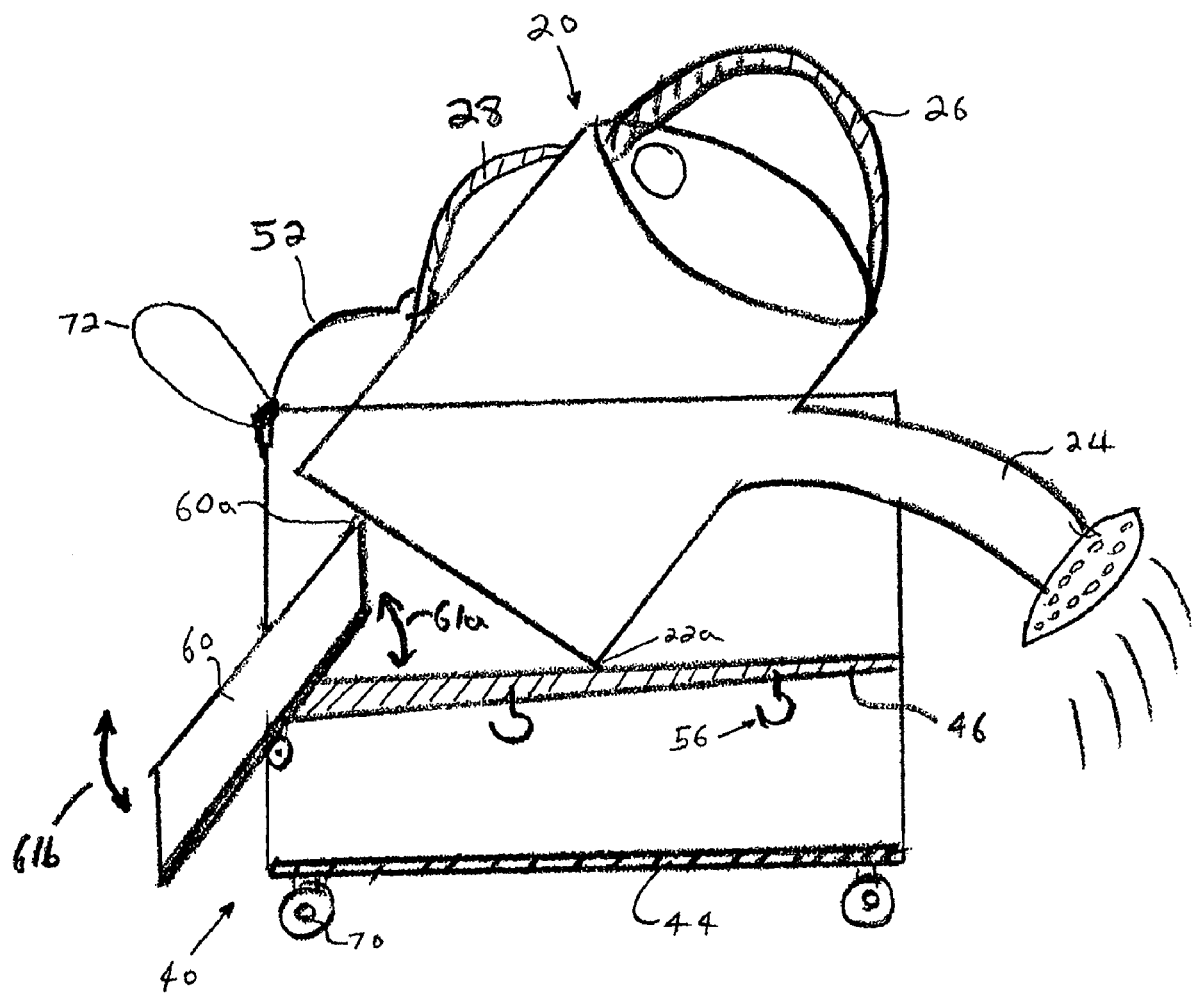
FIG. 4 is a schematic illustration of the rolling watering system of the present invention shown in the raised position.
Figure 5:
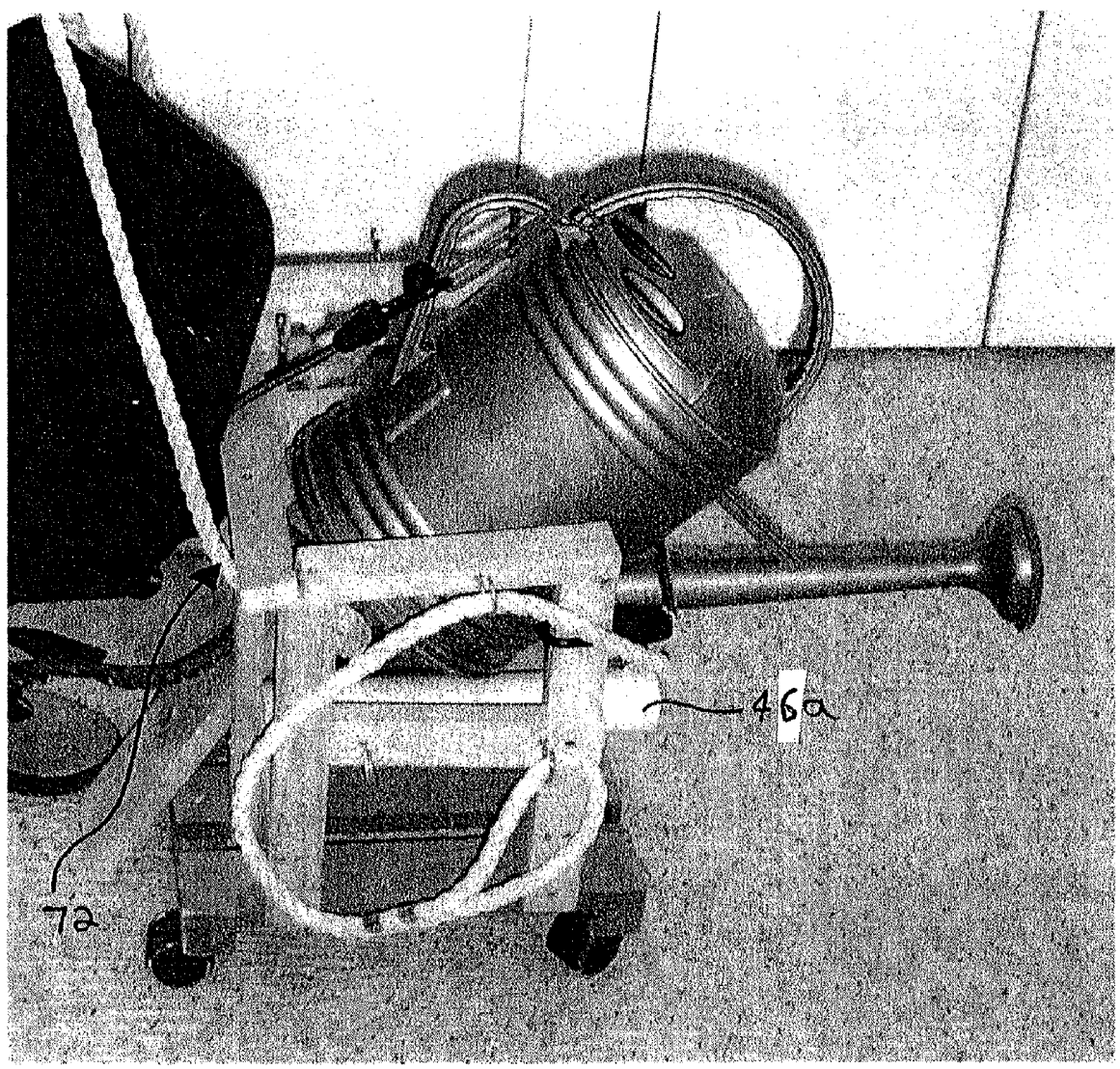
FIG. 5 is a photograph showing the exemplary rolling watering system of the present invention in the raised position.

During use of the rolling watering system of the present invention, a user uses one's foot (or knee or hand, if desired) to depress lever 60. The user's foot presses down on end 60b of lever 60 to cause end 60a to lift up thus raising the rear portion of watering can 20 (referred to herein as the "raised position"). FIGS. 4 and 5 show the rolling watering system in the raised position. In the raised position, elastic cord 52 and, if used, elastic cord 54 maintain watering can 20 in an appropriately angled position. That is, elastic cord 52 (and optionally elastic cord 54) prevent watering can 20 from moving forward and falling off the front end 60a of lever 60, and also prevent the front bottom end of watering can 20 from moving forward and falling off support floor 46. In this raised position, water within watering can 20 is dispensed through the watering can's spout 24, as desired.

To discontinue watering, or after all or most of the water within watering can 20 has been dispensed, the user removes his/her foot from lever 60 to cause the lever to return to its initial resting position thus causing watering can 20 to return to its non-lifted position (also referred to herein as the "lowered position"), as shown in FIG. 1. In FIGS. 1 and 4, arrows 61a and 61b show the directions of movement of the front and rear ends 60a, 60b of lever 60.

In FIG. 4, the rear bottom surface of watering can 20 is shown to be disposed resting on an edge of the lever's front end 60a. During use, when lever 60 is disposed in this position (to provide watering can 20 in the raised position), the user may remove his/her foot from lever 60 without causing the watering can to return to the lowered position. Then, after completion of watering, the user may lift the lever's rear end 60b by placing his/her foot beneath the lever's rear end and raising his/her foot a short distance to cause watering can 20 to return to its lowered position. In a variation, an additional lever coupled to the cart is employed to facilitate the lifting of rear end 60b, or the lowering of front end 60a.

In another variation, the lever's front end 60a is curved or otherwise shaped to prevent watering can 20 to remain in the raised position thus requiring the user to keep his/her foot on the lever to dispense water (i.e., to maintain watering can 20 in the raised position).

Watering can support floor 46 may be a flat surface that fully extends between left and right side surfaces 48. In a preferred embodiment, as shown in FIGS. 2 and 5, the watering can support floor 46 does not extend fully between the sides of the rolling watering system of the present invention but rather only supports left and right bottom portions of the watering can, and thus does not support the center bottom of the watering can. In such variation, and during movement between the lowered and raised positions, the watering can pivots along an axis that is behind the front end of the watering can's bottom surface, as shown in FIG. 5. That is, the bottom of the watering can pivots during movement between the raised and lowered positions along an axis that is disposed between the front tip of the bottom of the watering can and the watering can's bottom mid-point (or center bottom point) (for round-shaped bottoms).

In a different variation where support floor 46 supports the entire bottom of the watering can, the watering can pivots on its bottom front tip 22a during movement between the lowered and raised positions, as shown in FIG. 4. For square or rectangular shaped watering can bottoms, the watering can pivots (i.e., is raised) in the manner shown in FIG. 4 generally regardless of whether support floor 46 supports the entire watering can bottom or only portions thereof.

Generally, use of a round bottom watering can along with a watering can support floor 46 that supports only the outer (i.e., left and right) portions of the watering can bottom is preferred since less force/exertion is required to move the watering can from the lowered position to the raised position.

In a variation of the preferred embodiment mentioned above, support floor 46 is comprised of left and right cylinders 46a and 46b, as shown in FIG. 5 (only left cylinder 46a is shown in FIG. 5; both left and right cylinders 46a and 46b are shown labeled in FIG. 2). By providing cylinders (i.e., round supports), the watering can pivots even more easily during movement of the watering can from the lowered position to the raised position.

Cart 42 may include multiple hooks 56 for holding various garden tools, such as a trowel 58. Other tools that may be held include shovels, clippers, gloves, etc. Additional storage is provided by the space between bottom floor 44 and support floor 46, wherein tools and other objects may be stored on bottom floor 44. Bottom floor 44 may include side walls to prevent stored objects from falling off during movement/use of the rolling watering system of the present invention. Bottom floor 44 may contain multiple compartments to keep stored items separated from one another, if desired. Bottom floor 44 may be designed to include one or more drawers for storage of tools and other items.

As shown in FIGS. 1 and 4, and as best shown in FIG. 5, the rolling watering system includes a rope 72 to facilitate easy movement of the rolling watering system and to facilitate stability of the rolling watering system during use (e.g., while depressing lever 60 with one's foot). In a variation, rather than using a rope, a suitably long handle extending from cart 42 may be utilized.

The rolling watering system 10 of the present invention, as herein described, allows for the relatively easy use of large watering cans. Such use includes both movement of the watering can between different locations and dispensing of water stored within the watering can on/near plants, shrubs, trees, vegetable gardens, flower beds, etc. To use the rolling watering system of the present invention, watering can 20 disposed on dispensing system 40 is filled with water using a garden hose connected to a water faucet or by other appropriate means. The rolling watering system then is rolled, utilizing rope 72, an attached handle or other device, to a location to be watered, such as a flower bed. The rear 60b of lever 60 is depressed (i.e., lowered) to cause watering can 20 to move from the lowered position (FIG. 1) to the raised position (FIG. 4). In the raised position, water is dispensed through spout 24 onto the flower bed, as desired. Preferably, to allow for the use of the rolling watering system while in a standing position, the user holds onto rope 72 while depressing lever 60 to keep the rolling watering system from moving while water is being dispensed. Thus, rope 72 serves multiple purposes: (1) to facilitate easy movement of the rolling watering system between different locations; and (2) to stabilize the rolling watering system during use (i.e., while dispensing water). Upon completion of watering, the rear end 60b of lever 60 is raised (either by removing one's foot from the lever or, in a different embodiment, forcibly lifting the lever's rear end 60b) thus causing watering can 20 to return to the lowered position. The rolling watering system then may be moved to another location to be watered or, if necessary, refilled with water.

The rolling watering system of the present invention, as described herein, advantageously allows for the usage of relatively large watering cans without requiring the user to manually lift such watering cans when filled with water, which can weigh as much as 24 pounds or even more. At no point during the entire watering process does a user of the rolling watering system need to lift the watering can with one's hands. By the use of various components, including elastic cords, ropes, levers, support floors, wheels, and so on, the rolling watering system of the present invention provides for an otherwise potentially strenuous task to be carried out with relatively minimal effort.

If desired, the watering can be detached from the dispensing system and utilized in the ordinary manner. For example, when nearly all of the water within the water can is dispensed, the user optionally can disconnect the watering can and then use the watering can in the ordinary manner to dispense all of the remaining water within it.

The foregoing discussion and drawings provide for a rolling watering system having particular components of various shapes and sizes. It is appreciated, however, that such components may be modified without departing from the spirit and scope of the invention. For example, the drawings illustrate a dispensing system having a generally box-like structure. Such design is merely exemplary. The dispensing system may include other designs, such as rounded, oval, taller, shorter, longer, wider and/or narrower components, capable of supporting watering cans of various shapes and sizes. Moreover, lever 60 may include a modified design by the use of gears and other components to facilitate the relatively easy movement of a filled watering can from a lowered position to a raised position. Other components described herein likewise may be modified in manners known in the art.

Therefore, it is intended that the appended claims be interpreted as including the embodiments described herein, the alternatives mentioned above, and all equivalents thereto.

What is claimed is:

1. A watering system, comprising:
   a watering can having a bucket to hold water and a spout coupled to the bucket to dispense the water held in the bucket, the watering can having a round bottom; and
   a dispensing system having a cart to support the watering can, a plurality of wheels coupled to a bottom of the cart to facilitate movement of the dispensing system on a surface, and a lever pivotably coupled to the cart, the cart including a rear support to support a rear of the watering can, the lever pivotably attached to the rear support and allowing manual movement of the watering can between a lowered position in which water held in the bucket is not dispensed and a raised position in which water held in the bucket is dispensed through the spout; the lever having a first end disposed beneath the round bottom of the watering can and a second end extending behind the rear support of the cart, the second end of the lever lowering by a user to cause the first end of the lever to lift up thereby moving the watering can from the lowered position to the raised position, the cart including a support floor comprised of left and right cylinders for supporting left and right portions, respectively, of the round bottom watering can, the support floor not physically located under a center bottom of the watering can so that the watering can pivots on the support floor along an axis along an axis disposed behind a front end of the round bottom of the watering can when moved between the lowered and raised positions, wherein the cart including left and right side supports, the watering can being disposed between the left and right side supports, the watering system including a first elastic cord attached to a rear of the watering can and also attached to the rear support of the cart to prevent the watering can from falling off the support floor and the lever when the watering can is moved to the raised position, the watering system further including a second elastic cord coupled between the left and right side supports and disposed in front of the watering can at a position near the spout stabilizing the watering can during movement of the watering can between the lowered and raised position.

2. The watering system of claim 1, wherein the cart includes a bottom floor to which the plurality of wheels are coupled, the support floor and the bottom floor being separated from one another.

3. The watering system of claim 1, wherein the cart includes a plurality of hooks to support a plurality of garden tools.

4. The watering system of claim 1, further comprising a rope extending from the dispensing system, the rope allowing a user to pull the watering system on the surface, the rope further allowing the user to stabilize the watering system when the watering can is in the raised position and dispensing water.

* * * * *